Patented Nov. 21, 1933

1,936,230

UNITED STATES PATENT OFFICE 1,936,230

MANUFACTURE OF VARNISHES AND PRIMING COMPOUNDS

Erich Walter Frenkel and Alexander Brust, Molkau, near Leipzig, Germany, assignors to Pittsburgh Plate Glass Company, a corporation of Pennsylvania No Drawing. Application November 28, 1924, Serial No. 752,756, and in Germany December 21, 1923. Renewed November 14, 1932

8 Claims. (Cl. 134—26)

This invention relates to a novel method of manufacturing varnishes, japans and the like, and in particular to means of incorporating the priming or underground material with the body of the varnish or japan, and of preventing undesired separation and depositing of the same. It is well known to add to drying oils and their solutions or to japans and lacquers of all kinds so-called pore fillers for priming purposes, the main function of which is to close the pores of an absorbent or imbibing ground material at the proper time, so as to prevent the priming substance from being swallowed up by the ground material, the priming substance serving to produce a layer of material of which a sufficient amount will remain suspended upon applying the first coat. A variety of substances have been suggested as pore fillers; among others, starch, glass powder, kaoline, talc, rotten stone, chalk, kieselguhr, and the like. All these substances, however, constitute foreign substances in the priming agent, and therefore disturb the coherence of the layer in proportion as their amount is increased. The employment of large amounts, however, cannot always be avoided, particularly in those cases where the priming of very absorbent material is to be effected, as is ordinarily the case in the treatment of articles manufactured in great masses. There are, moreover, the additional very serious difficulties that such additions, on account of their high specific gravity, are more or less inclined to precipitate, which interferes greatly with the storing and utilization of large quantities.

It is one of the important objects of our invention to overcome these difficulties, and this is accomplished mainly by the addition, to the fatty drying oil, of an organic pore filling substance which is by itself insoluble in the fatty oil. The pore filling substance may be incorporated with the fatty drying oil in so finely distributed condition that the pore filler will permanently remain suspended in the oil, and according to the preferred method of carrying out our invention the pore filler is converted into the colloidal state.

In place of fatty drying oils mixtures of the same with resins may be used. In the course of our experiments it has also been found in some cases to be of advantage to make use of previously blown fatty drying oils. We have ascertained that fatty drying oils which have been thickened by the treatment with sulphur-chlorides may be employed as pore fillers.

Whenever there is a danger of premature coagulation of the varnish upon the addition of certain pore fillers to the fatty drying oils, japans, lacquers or the like, the treatment is carried out with the addition of suitable solvents, such as for instance, benzene or benzol which serve as diluents.

If the quantity of sulphur chloride be great enough, after an interval of time, hard material would be formed which would separate from the solvent. In order to prevent premature hardening, an additional quantity of fatty drying oils is incorporated in the mixture. Therefore, by correctly timing the addition of this quantity of fatty drying oils, the sulphur chloride will effectively bring into solution a considerably greater quantity of fatty drying oils, with the result, first, that the action of the substances one upon the other is carried out more slowly and, second, solid material is no longer formed.

By this process the pore filler goes into solution in a colloidal state as formed. According to the quantity of oil available for addition, it is possible to change the degree of dispersion of the colloidal solution.

EXAMPLE

*Priming compound with linseed oil and sulphur-chloride*

30 parts of preferably blown linseed oil are stirred together with 1 to 2 parts sulphur chloride. A reaction ensues with generation of heat which may be mitigated by the addition of diluents (benzine, benzol and the like). At the moment at which the mass is just in condition of barely being stirrable the reaction is interrupted and 40 parts of linseed oil are gradually added. By further additions of oil-drier and benzine the mass is diluted to painting consistency.

The varnishes obtained by the procedure hereinbefore described contain the pore-filling substance of low specific gravity in such an extremely fine distribution as cannot be accomplished by the ordinary methods, and the pore filling action of the compound is therefore very complete and uniform. As a special advantage the extremely intimate combination of the colloidally distributed pore filling substance with the dry coating should be mentioned.

It should be remarked that the invention is susceptible of modifications and changes to conform to varying conditions of application, and within the scope of the claims hereunto appended.

We claim:—

1. The process of manufacturing varnishes and the like which consists in causing a reaction between a body of blown linseed oil and less than five per cent of sulphur chloride and a quantity of a thinner and adding a drier thereto.

2. In a process of manufacturing varnishes, paints, and the like that step which consists in causing a reaction between a body of blown linseed oil and not more than seven per cent of sulphur chloride.

3. A process of manufacturing varnishes, paints and the like which consists in causing a reaction between a body of blown linseed oil and not more than seven per cent of sulphur chloride and adding a thinner and a drier thereto.

4. A process of manufacturing paints, varnishes and the like which consists in causing a reaction between blown linseed oil and a small quantity of sulphur chloride, interrupting the reaction before completion and diluting the mass to form a colloidally suspended priming product, and adding a drier to the product.

5. A process of manufacturing paints, varnishes and the like which consists in causing the reaction of blown linseed oil and a small quantity of sulphur chloride and interrupting the reaction at an intermediate stage by the addition of a thinner to obtain a product in a dispersed state.

6. A process of manufacturing paints, varnishes and the like which consists in causing a reaction between blown linseed oil and a small proportion of sulphur chloride, and by incorporating a thinner in the oil obtaining an intermediate reaction product in a dispersed state, and adding a drier to said product.

7. A paint adapted to priming purposes, comprising a mixture of a thinner and drier with the colloidally suspended reaction product of the process of claim 4.

8. A process of manufacturing paints, varnishes and the like which consists in causing a reaction between blown linseed oil and a small quantity of sulphur chloride in the presence of a diluent, interrupting the reaction before completion and diluting the mass to form a colloidally suspended priming product, and adding a drier to the product.

ERICH WALTER FRENKEL.
ALEXANDER BRUST.